United States Patent [19]

Saeki et al.

[11] Patent Number: 4,914,471
[45] Date of Patent: Apr. 3, 1990

[54] PHOTOGRAPHIC PRINTING METHOD, APPARATUS THEREFOR, AND A STRIP OF ORIGINAL FILM EMPLOYED IN THE METHOD AND APPARATUS

[75] Inventors: Yoshihiko Saeki; Kanji Tokuda; Kiichiro Sakamoto, all of Kanagawa; Fumio Matsumoto, Tokyo, all of Japan

[73] Assignee: Fuji Photo Film Co., Ltd., Kanagawa, Japan

[21] Appl. No.: 200,830

[22] Filed: Jun. 1, 1988

[30] Foreign Application Priority Data

Jun. 5, 1987 [JP] Japan ............................. 62-140899
Jun. 5, 1987 [JP] Japan ............................. 62-140900

[51] Int. Cl.⁴ ............................................. G03B 27/52
[52] U.S. Cl. ........................................ 355/40; 355/41; 355/68
[58] Field of Search ..................... 355/38, 40, 68, 77, 355/41

[56] References Cited

U.S. PATENT DOCUMENTS

| | | | |
|---|---|---|---|
| 4,659,213 | 4/1987 | Matsumoto | 355/40 X |
| 4,707,120 | 11/1987 | Yamamoto | 355/38 |
| 4,782,390 | 11/1988 | Hayashi et al. | 355/38 X |
| 4,797,713 | 1/1989 | Terashita et al. | 355/38 X |

Primary Examiner—Michael L. Gellner
Assistant Examiner—D. Rutledge
Attorney, Agent, or Firm—Sughrue, Mion, Zinn, Macpeak & Seas

[57] ABSTRACT

An original film is provided with main numbers and sub numbers which are alternately located at intervals equivalent to the length of one half-size frame image, as well as bar codes which represent the main numbers and the sub numbers. Since the frame images on the original film can be specified by reading with a reading means the main numbers and/or the sub numbers located at the sides of the frame images to be printed onto the printing paper, the main numbers and/or the sub numbers are provided on the printing paper so as to identify the frame images on the original film.

22 Claims, 12 Drawing Sheets

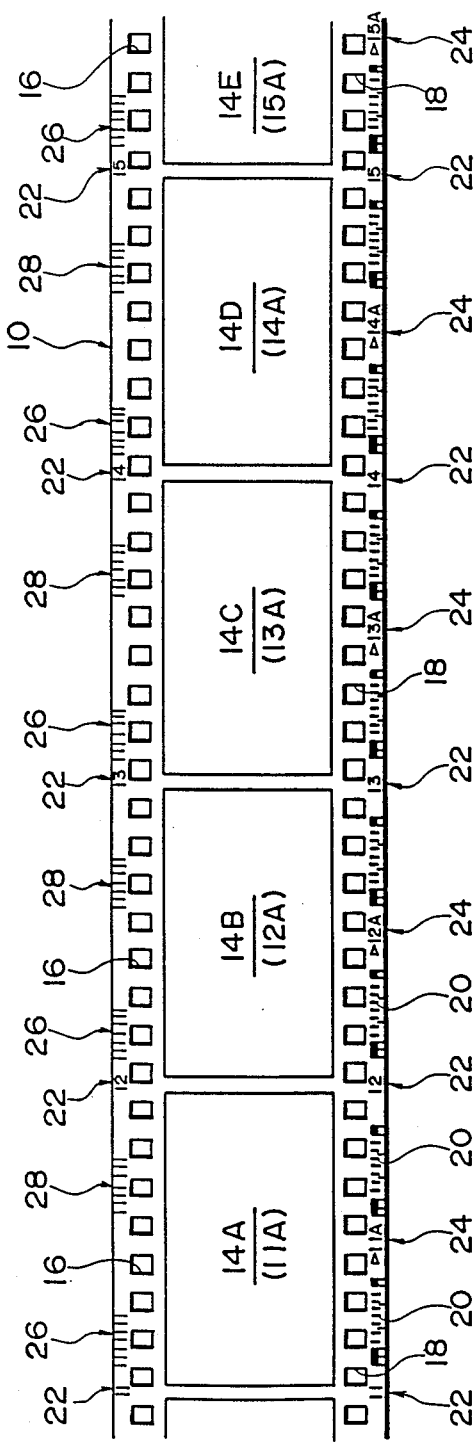

PHOTOGRAPHIC PRINTING METHOD, APPARATUS THEREFOR, AND A STRIP OF ORIGINAL FILM EMPLOYED IN THE METHOD AND APPARATUS

BACKGROUND OF THE INVENTION

1. Field of the Invention:

The present invention relates to a photographic printing method, an apparatus therefor, and a strip of original film employed in the method and apparatus which enable the frame images on a photographic film which correspond to the frame images on a sheet of printing paper to be easily identified.

2. Description of the Prior Art:

In a case where the frame image carried on an original, film is printed on a piece of printing paper, the piece of printing paper on which the frame image has been printed is developed, and is then handed over to a customer together with the original film. Further, when a large number of original films are to be processed, a plurality of original films are connected in series for printing purposes. Thereafter, a sheet of printing paper is unrolled, so that the frame images carried on these original films are sequentially printed thereon. The printing paper is then developed and cut into frames.

In the above-described cases, since the printing paper on which the images have been printed is not provided with means for collating it with the original film, an operator must collate the printing paper with the original film by visually checking the images.

Further, when frame images which have been printed with an unsuitable printing density are printed again, the frame images carried on the printing paper must be visually checked so that the corresponding frame images on the original film can be found. Additionally, when a customer orders additional prints by referring to several already printed frames from the original film, the frame images on the original film which correspond to those on the printed frames must be visually searched for.

SUMMARY OF THE INVENTION

In view of the above-described problems of the prior art, an object of the present invention is to provide a photographic printing method, an apparatus therefor, and a strip of original film employed in the method and apparatus which enable the frame images of a photographic film which correspond to the frame images of a printing paper to be easily identified.

To this end, the present invention provides, in one of its aspects, a photographic printing apparatus for printing a plurality of images carried on an original film on a sheet of printing paper, which comprises: (a) reading means for reading bar codes on the original film provided with main numbers, sub numbers, and the bar codes representing the main numbers and the sub numbers, the main numbers and the sub numbers being alternately located on the original film at intervals equivalent to the length of a half-size image frame; (b) a light source for printing the images; (c) an optical means for forming the images on the printing paper; and (d) means for providing the printing paper with the main frame numbers or the sub frame numbers which correspond to the bar codes read by the reading means, whereby the images printed on the printing paper are made to correspond to the images on the original film using the frame numbers.

In the case of a photographic film which carries full-size frame images, the frame images correspond to the main frame numbers and the sub frame numbers. In the case of a photographic film which carries half-size frame images, the frame images correspond to the main numbers or the sub numbers, or the frames are located between the main numbers and the sub numbers. Therefore, the frame images on the original film which correspond to the frame images on the printing paper can be specified by providing the printing paper with these numbers.

Thus, in the case of full-size frame images, the corresponding frame images can be easily and quickly searched for on the original film by checking the main numbers or the sub numbers using the bar codes on the photographic film. Further, in the case of half-size frame images, since the frame images on the original film are identified by the main numbers and/or the sub numbers, they can be found by detecting the corresponding bar codes.

The bar codes may be provided on the original film at the same positions in the longitudinal direction of the film as those of the main numbers and the sub numbers. Alternatively, they may be provided at positions spaced apart by a predetermined distance in the longitudinal direction of the film. The main numbers or the sub numbers may be provided on the printing paper using characters, a plurality of dots or other special symbols, as well as the numerals which represent them. The main numbers or the sub numbers may be provided around the frames of the printing paper or at positions separated from the frames, as well as on the rear surface of the printing paper.

The present invention provides, in another of its aspects, a strip of original film developed after it has been exposed to form images thereon, which includes: (a) main numbers and sub numbers alternately provided on the sides of frame images at intervals equivalent to the length of a half-size frame image; (b) first bar codes located at the sides of the frame images, the first bar codes representing the main numbers; and (c) second bar codes located among the first bar codes, the second bar codes representing the sub numbers, whereby selection of particular full-sized frame images or particular half-sized frame images can be made using the first bar codes and/or the second bar codes, in whatever pitch they are shifted in the longitudinal direction of the film when they are carried on the film.

The present invention provides, in another of its aspects, a photographic printing method of printing on a sheet of printing paper images carried on an original film which is provided with main numbers and sub numbers as well as bar codes corresponding to the main numbers and sub numbers, the main numbers and the sub numbers being alternately located on the original film at intervals equivalent to the length of a half-size frame image, which includes a step of: providing the printing paper with the main numbers or the sub numbers when full-size frame images are printed, or either of the main numbers or the sub numbers or both of the main numbers and the sub numbers when half-sized images are printed.

DETAILED DESCRIPTION OF THE PREFERRED EMBODIMENTS

Figure 1B:
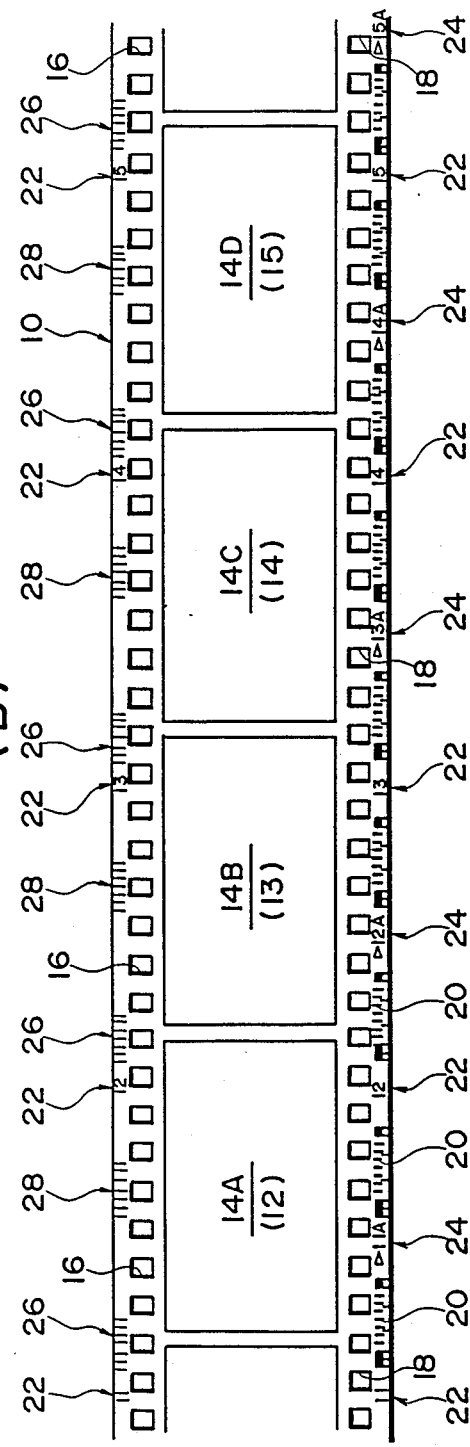
FIG. 1 is a plan view of a photographic film which carries full-size frame images, and to which the present invention is adopted.
Figure 1:
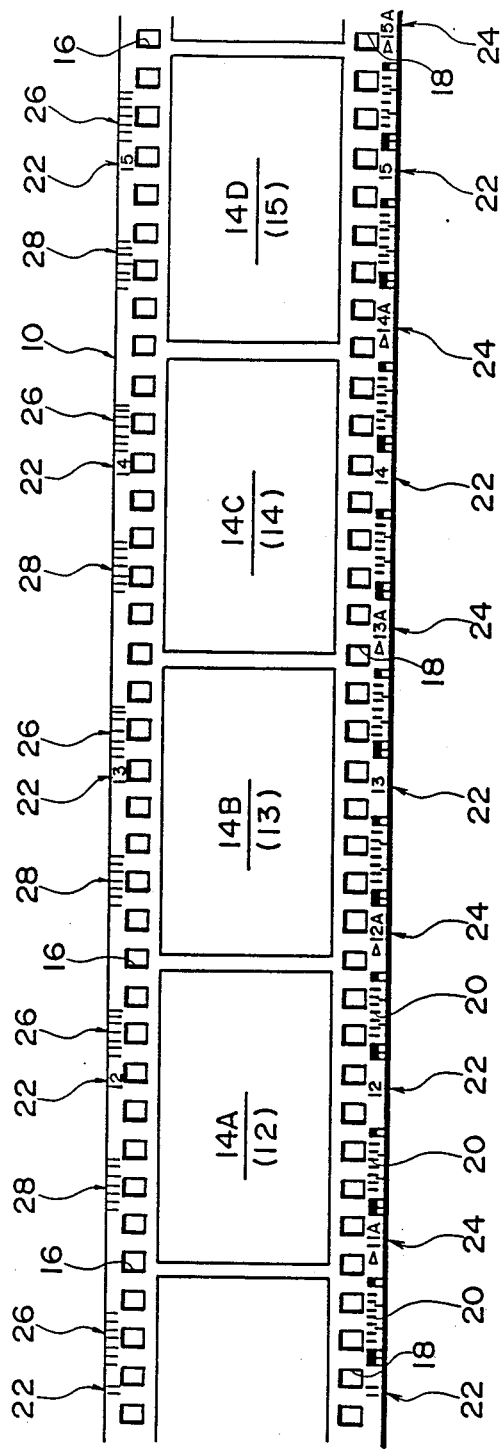
Figure 1:
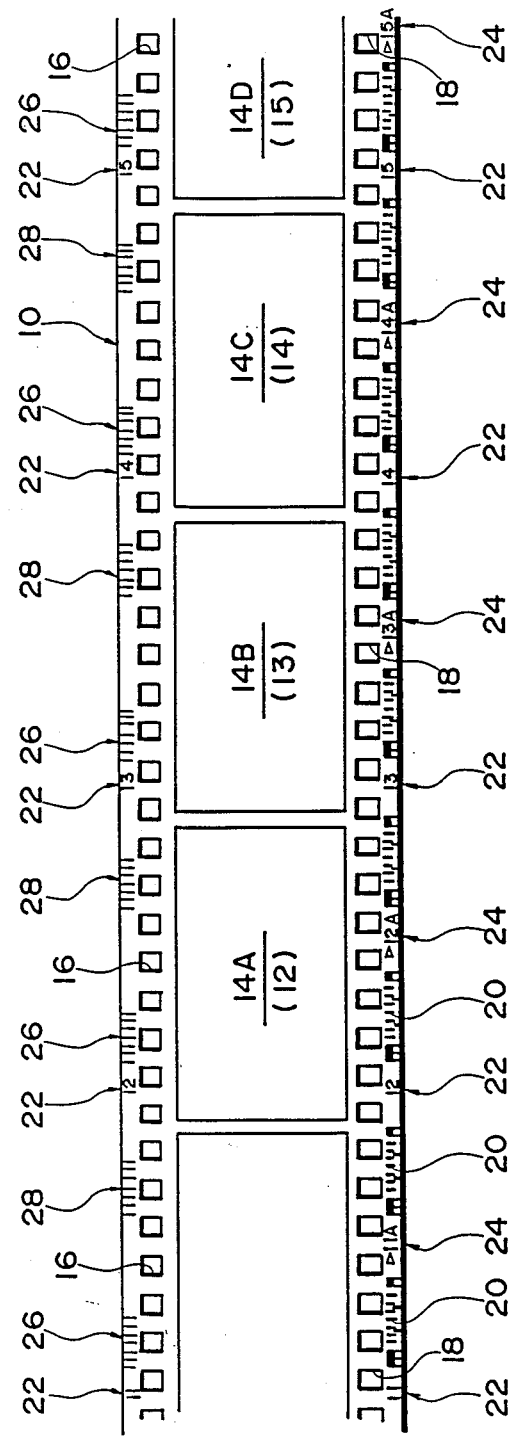
Figure 2:
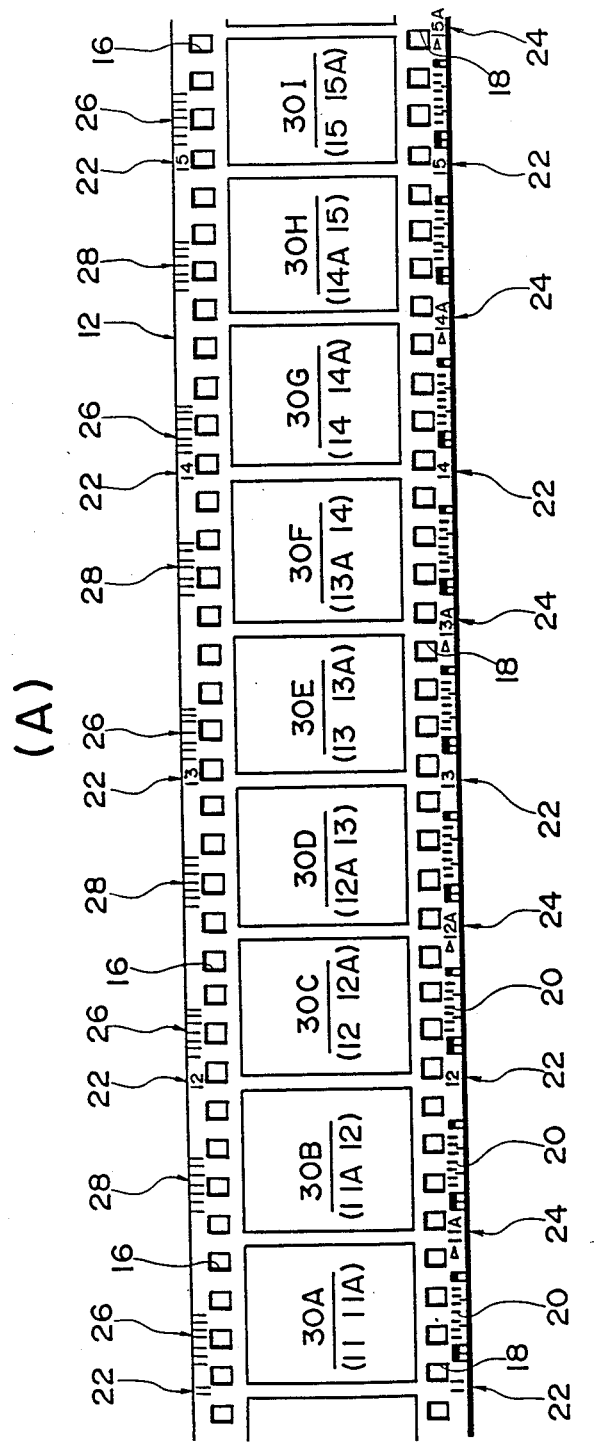
FIG. 2 is a plan view of a negative film which carries half-size frame images, and to which the present invention is adopted.
Figure 2:
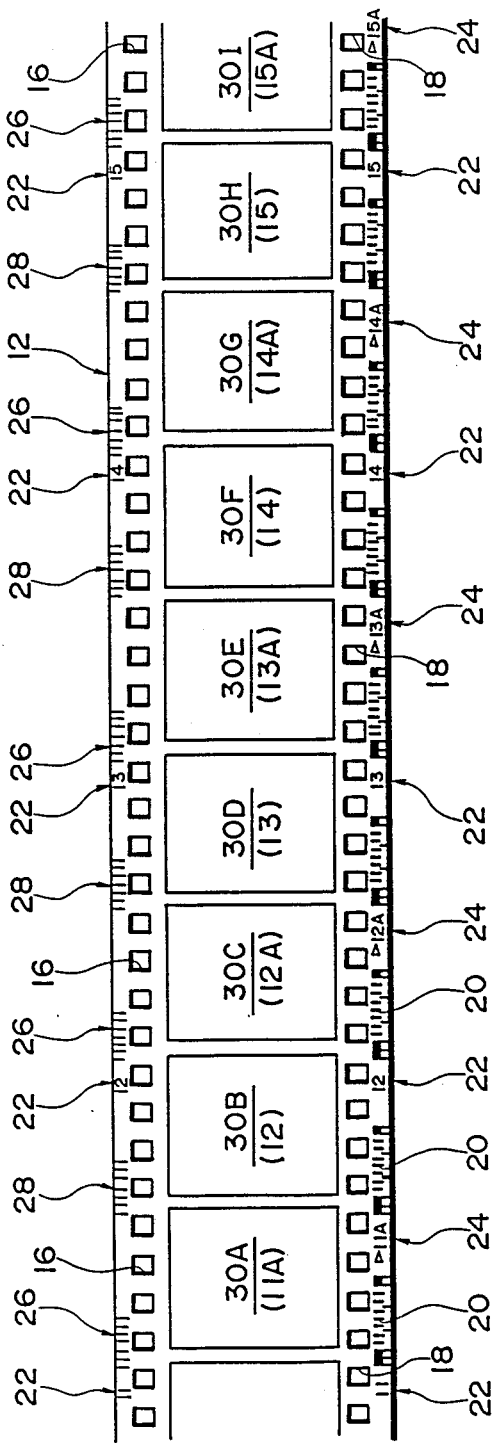
Figure 2C:
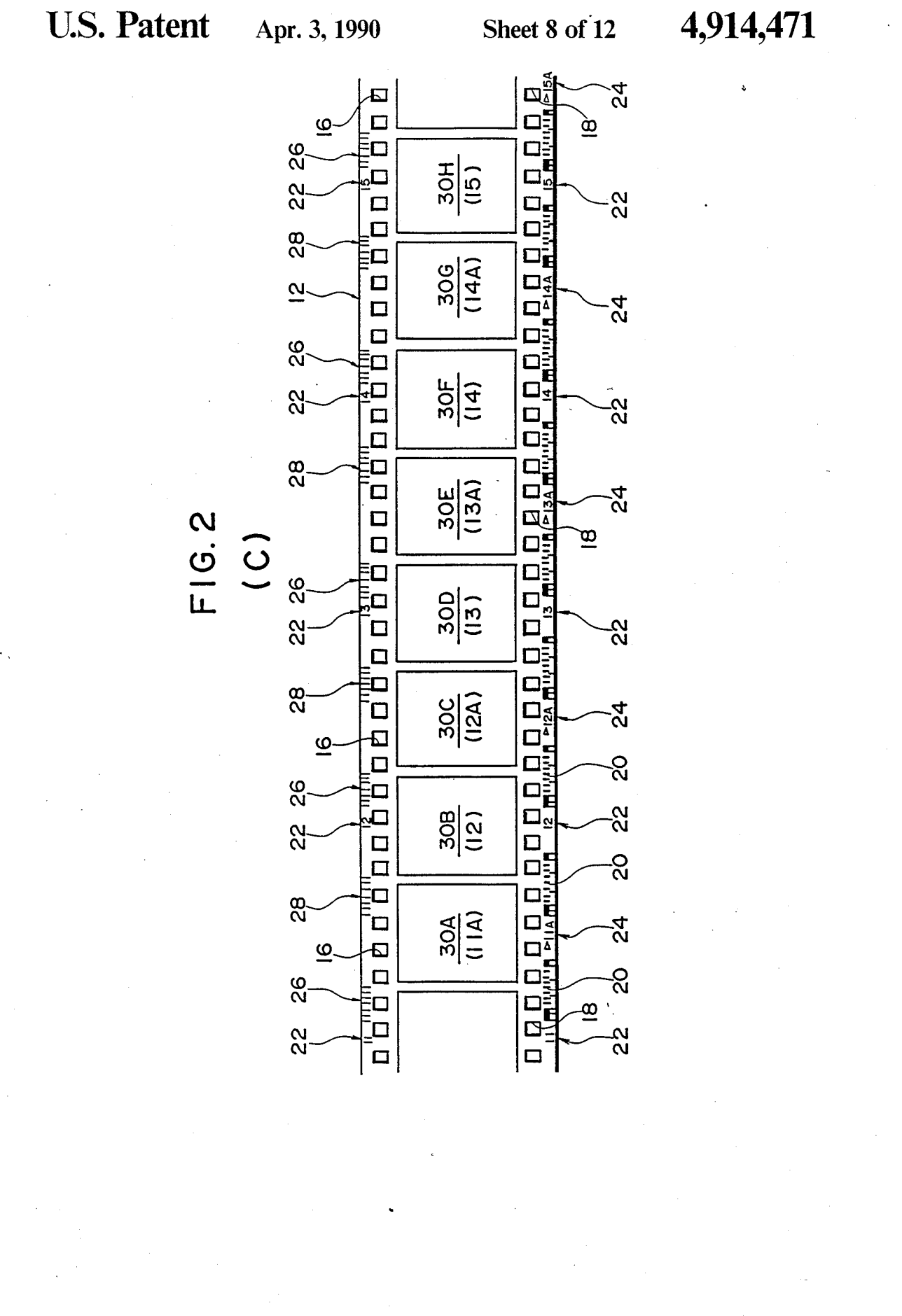
Figure 2:
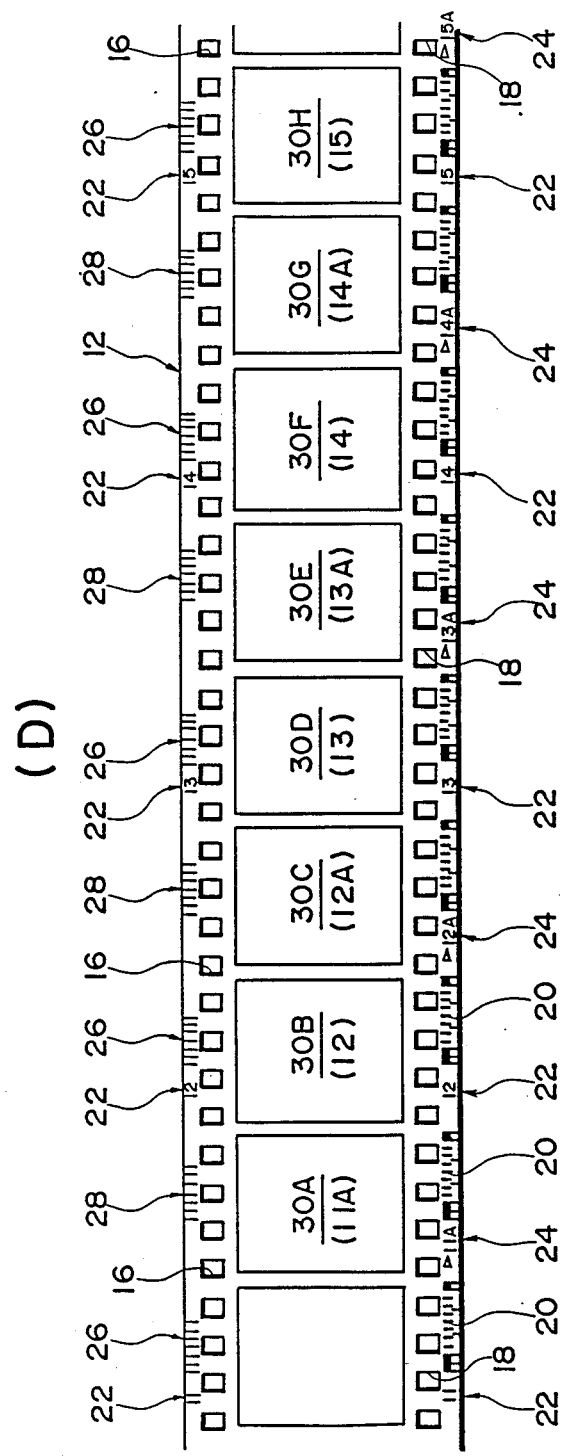
Figure 2:
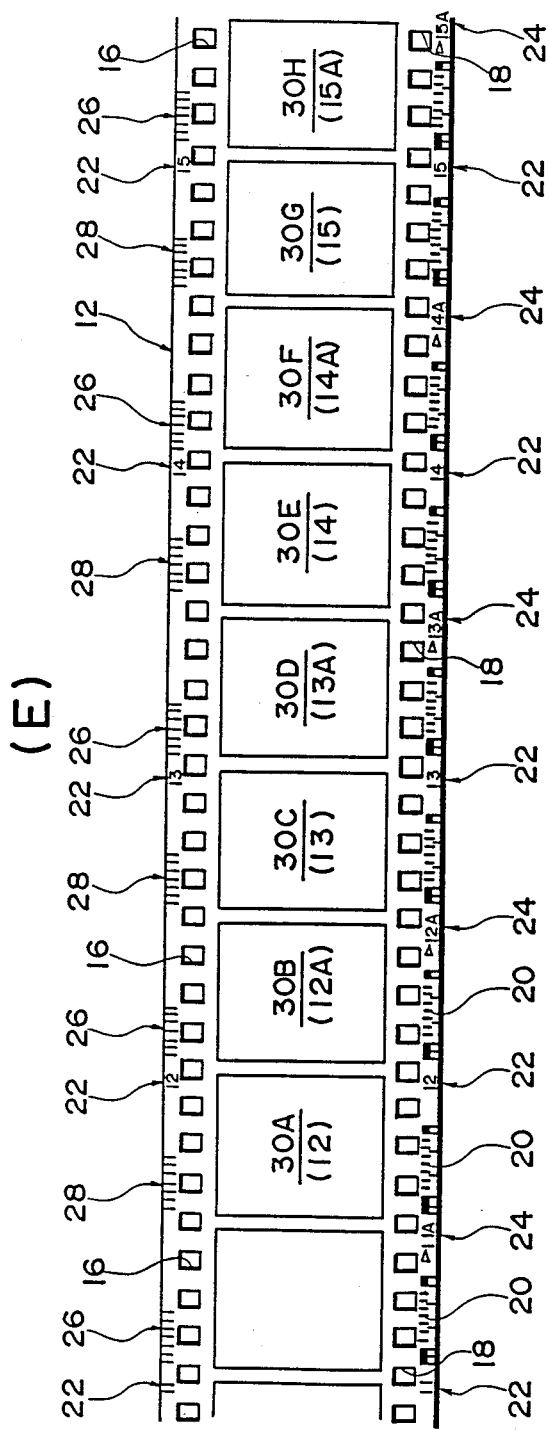

FIGS. 1 and 2 show the intermediate portions of photographic films 10 and 12 of the type employed in the present invention.

Each of the photographic films 10 is a film which has a size of 135, and which consists of full-size frame images 14 (14A, 14B, ...) disposed in series at predetermined intervals.

A large number of perforations 16 and 18 which are to be engaged with sprockets (not shown) are provided at predetermined intervals along the two edge portions of each of the photographic films 10. A large number of bar codes 20 having the same shape are provided at predetermined intervals between the edge of each of the photographic films 10 and the perforations 18, the bar codes 20 being formed during the manufacture of the film. The individual bar codes 20 identify the manufacturer, the lot number and the type of photographic film 10.

Main frame numbers 22 are respectively provided on each of the photographic films 10 between the bar codes 20 and between the other edge of the photographic film 10 and the perforations 16, the main frame numbers 22 being formed at predetermined intervals and at the same positions in the longitudinal direction of the film during manufacture thereof. The main frame numbers 22 formed at the two edges of each of the photographic films 10 are represented by integers starting from 1 on one side of the photographic film 10. The integers representing the main frame numbers 22 are provided at the same pitch at which the frame images 14 are formed. Sub frame numbers 24 are provided at the mid-points between the adjacent main frame numbers 22, i.e., at positions at which one-half pitch to the right as viewed in FIG. 1. The sub frame numbers 24 are represented by the integers which are located immediately at the left side of the main frame numbers 22 and to which the character "A" is appended.

Bar codes 26 and 28 which respectively identify the main and sub frame numbers 22 and 24 are provided among the adjacent main frame numbers 22 located along one edge of each of the films (at the upper edge as viewed in FIG. 1), the bar codes being formed during manufacture. The bar codes 26 and 28 are respectively located at positions which are spaced apart a predetermined distance in the rightward direction as viewed in FIG. 1 from the corresponding main frame numbers 22 and sub frame numbers 24. This enables the main frame numbers 22 and the sub frame numbers 24 to be detected by reading the corresponding bar codes 26 and 28.

FIGS. 1 (A) to (E) show the photographic films 10 which carry the frame images 14 in a state wherein they are sequentially shifted in the rightward direction at the different pitches. In the photographic film 10 shown in FIG. 1 (A), for example, the frame 14A is located between the main frame number 22 represented by "11" and the main frame number 22 represented by "12", i.e., the sub frame number 24 is located at the mid-point of the frame 14A. Therefore, the frame 14A can be made to correspond to the corresponding image on a sheet of printing paper by providing the printing paper on which the frame 14A is printed with the sub frame number 24 which corresponds to the frame 14A and which is represented by "11A".

In the photographic film 10 shown in FIG. 1 (B), since the frame images 14 are carried in a state wherein they are slightly shifted in the rightward direction from those carried on the film shown in FIG. 1 (A), they are identified by the main frame numbers 22 which are represented by "12" to "15". In the examples shown in FIGS. 1 (C) to (E), the frame images 14 are shifted from the state shown in FIG. 1 (B) in the rightward direction by the distance of the different pitches, and the frames 14 are respectively made to correspond to the main frame numbers 22 located at the sides thereof. In consequence, the frame images 14 can be identified by providing the printing paper with the corresponding main frame numbers 22.

The numeral in parenthesis indicated in each of the frames in FIG. 1 designates the numeral provided at the position of the sheet of printing paper at which that frame is to be printed.

FIG. 2 shows photographic films 12 in which half-sized frame images 30 (30A to 30I) are successively formed. The frame images 30 have a longitudinal dimension which is one half of that of the frame images 14 shown in FIG. 1.

In the photographic film shown in FIG. 2 (A), the frame images 30 correspond to neither the main frame numbers 22 nor the sub frame numbers 24, both of the main frame numbers 22 and the sub frame numbers 24 corresponding to the boundaries between the adjacent frame images 30. In consequence, each of the frame images 30 can be specified by providing the printing paper on which the frame image 30 is printed with both the main frame number 22 and the sub frame number 24 located at the forward and rear ends (at the right side and the left side) of the frame 30.

For example, the frame 30A located at the left end of the photographic film shown in FIG. 2 (A) can be specified by providing the printing paper with both the main frame number 22 represented by "11" and the sub frame number 24 represented by "12".

In the photographic films 12 shown in FIGS. 2 (B) to (E), the frame images 30 are carried on the photographic films 12 in a state wherein they are shifted in the rightward direction from those on the film shown in FIG. 2 (A) by the distance of the different pitches. In all of these cases, the frame images 30 correspond to the main frame numbers 22 or the sub frame numbers 24. Therefore, the frame images 30 can be specified by providing the main frame numbers 22 or the sub frame numbers 24 on the back of the sheet of printing paper.

The numeral in parenthesis which is given to each of the frames in FIG. 2 designates the numeral provided at the position of the sheet of printing paper at which that frame is to be printed.

Thus, in the case of photographic films carrying full-size frame images 14, the frame images 14 correspond to the main frame numbers 22 or the sub frame numbers. Therefore, the frame images 14 carried on the photographic film 10 can be identified by providing the sheet of printing paper with the main frame numbers 22 or the sub frame numbers 24. In the case of half-size frame images 30, the frame images 30 correspond to the main frame numbers 22 or the sub frame numbers 24, or the frame images 30 are located between the main frame numbers 22 and the sub frame numbers 24. Therefore, the frames 30 carried on the photographic film 12 can be specified by providing the sheet of printing paper with the main frame numbers 22 and/or the sub frame numbers 24.

Figure 3:
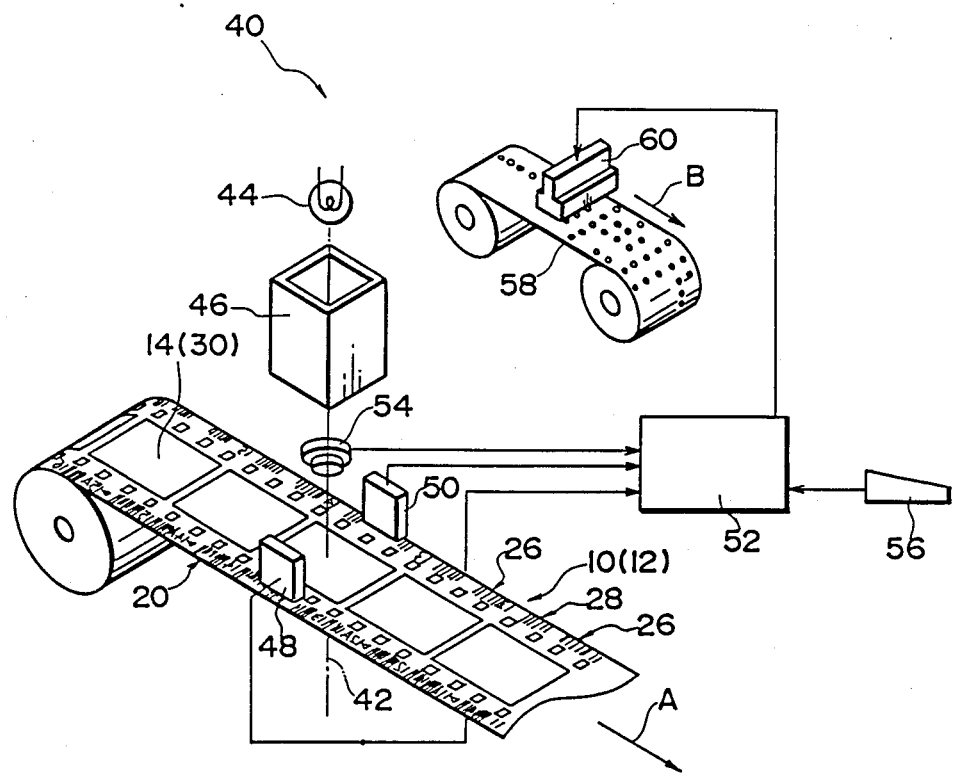
FIG. 3 is a schematic perspective view of a puncher to which the present invention is adopted.

FIG. 3 shows the essential parts of a puncher 40 to which the present invention is adopted. In the puncher 40, the developed photographic film 10 or 12 is fed in the direction indicated by the arrow A, by which the frame images 14 or 30 are sequentially disposed on an optical axis. Above the optical axis 42 are disposed a light source 44 and a light diffusing cylinder 46 so as to irradiate the frame images 14 or 30 disposed on the optical axis.

Bar code readers 48 and 50 for reading the bar codes 20, 26, and 28 are provided at positions which correspond to the two edges of the photographic film 10 or 12, the output signals of the readers being sent to a control device 52.

When the frames 14 or 30 are disposed on the optical axis 42, the information representing the photographic density or the like is detected by a sensor 54, and the output signals are sent to the control device 52 so as to enable a corrected exposure required for printing the frame images 14 or 30 to be determined. The information representing the corrected exposure may also be input from a keyboard 56 by an operator.

The puncher 40 also includes a paper tape 58 which is fed in the direction indicated by the arrow B in such a manner that the feed thereof is synchronized with that of the photographic film 10 or 12. A punch head 60 for punching the paper tape 58 by the signal from the control device 52 is located at a position which corresponds to the intermediate portion of the paper tape 58. The punch head 60 is adapted to record the main frame numbers 22 and the sub frame numbers 24 represented by the bar codes 26 and 28 which have been read by the bar code reader 48 at the positions which correspond to the frame images 14 or 30. At the same time, it also stores the corrected exposures of the frame images 14 or 30.

Figure 4:
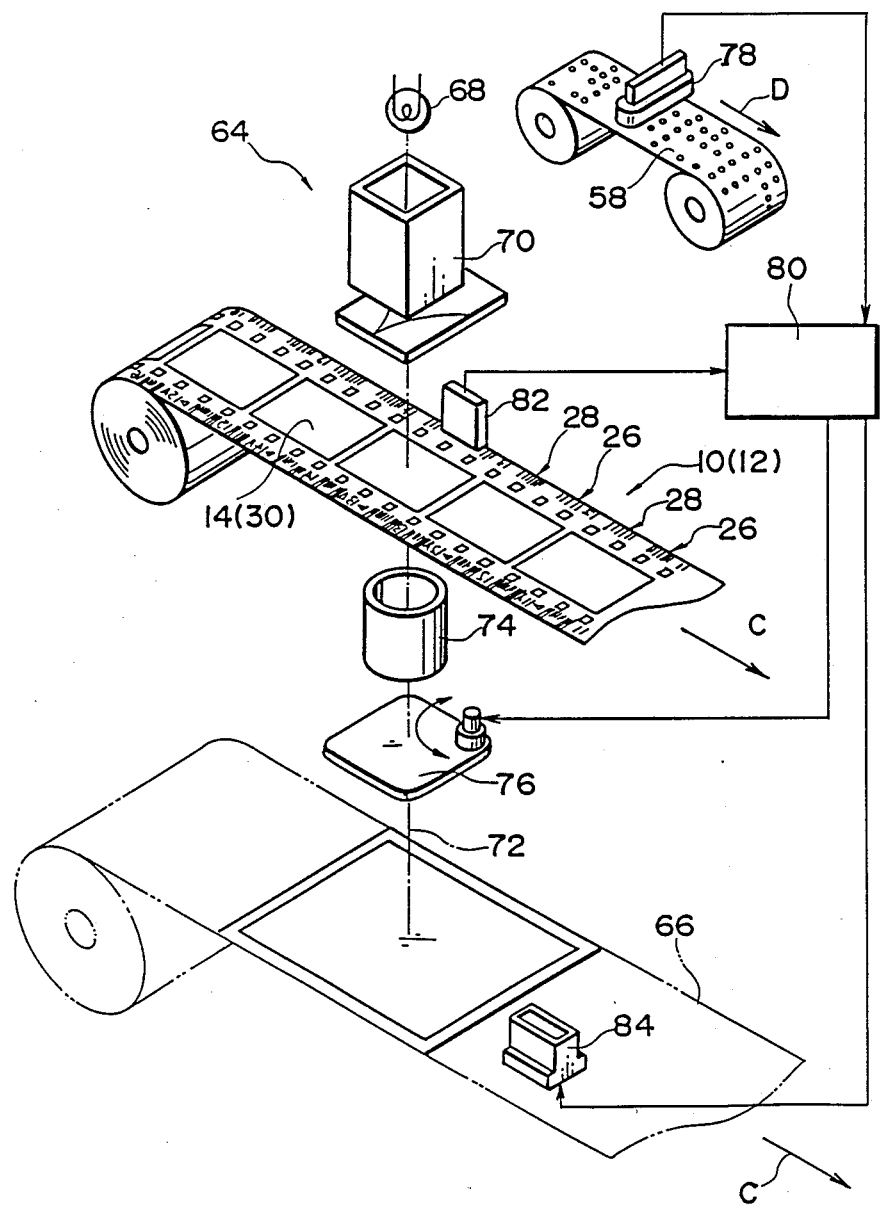
FIG. 4 is a schematic perspective view of a printer to which the present invention is adopted.

FIG. 4 shows the essential parts of a printer 64. The printer 64 employs the photographic film 10 or 12 and the paper taper 58 onto which the information has been recorded by the puncher 40 shown in FIG. 3, so as to print the images on a sheet of printing paper 66.

In the printer 64, the photographic film 10 or 12 is fed in the direction indicated by the arrow C, during which the frame images 14 or 30 are stopped at an optical axis 72 formed by a light source 68 and a light diffusing cylinder 70. Below the frame images 14 or 30 are provided an optical system 74 and a shutter 76 so as to print the images onto the sheet of printing paper 66.

The information carried on the paper tape 58 fed in the direction indicated by the arrow D is read by a reading head 78, and the output signal of the head 78 is sent to a control device 80. Further, a bar code reader 82 is provided at a position which corresponds to the portion of the photographic film 10 or 12 located on the optical axis 72 so as to read the bar codes 26 and 28, the output signal of the bar code reader 82 being sent to the control device 80. A dot printer 84 is provided in such a manner as to face the rear surface of the sheet of printing paper 66, by which the frame numbers represented by the bar codes 26 and 28 are printed by the signals from the control device 80 on the rear surface of the sheet of printing paper 66 in correspondence with the frame images.

The operation of the present embodiment will be described below.

The developed photographic film 10 or 12 is fed to the puncher 40 shown in FIG. 3. In the puncher 40, the bar codes 26 and 28 are read by the bar code reader 50 so as to detect the main frame numbers 22 and the sub frame numbers while the photographic film 10 or 12 is fed in the direction indicated by the arrow A. When the frame images 14 on the photographic film 10 or 12 are full-sized, as shown in FIG. 1, the main frame numbers 22 or the sub frame numbers 24 are selected, and the selected numbers are recorded on the paper tape 58 together with the corrected printing information on the frame images. When the frame images 30 are half-sized, as shown in FIG. 2, the main frame numbers 22 and/or the sub numbers are selected, and the selected numbers are recorded on the paper tape 58 together with the corrected printing information on the frame images.

To print the images on the original film to the printing paper, the photographic film 10 or 12 and the paper tape 58 are mounted on the printer 64 shown in FIG. 4. In the printer 64, the main frame numbers 22 and the sub frame numbers 24 of the frame images 14 or 30 which are read by the reading head 78 are made to correspond to the main frame numbers and the sub frame numbers 24 read by the bar code reader 82, and the shutter 76 is driven on the basis of the corrected printing information recorded on the paper tape 58 so as to print the images. Then, the image frame numbers on the photographic film 10 or 12 are printed by the dot printer 84 on the rear surface of the printing paper 66 on which the images have been printed.

Thereafter, the printing paper 66 is developed by a developing device, and is then cut into printed frames. Since the rear surface of each of the thus-prepared printed frames is provided with a frame number which is represented by the bar code, the printed frames can be easily collated with the images on the photographic film 10 or 12.

In consequence, when printing must be made again due to the printing failure, or when a customer orders additional prints, the required frame images on the photographic paper 10 or 12 can be easily selected by referring to the frame numbers provided on the rear surface of the printing paper 66.

In the above-described embodiment, the frame numbers are recorded on the paper tape 58. However, a magnetic tape or a magnetic film may also be used to record them.

What is claimed is:

1. A photographic printing apparatus for printing a plurality of images carried on an original film onto a sheet of printing paper, comprising:
   (a) means for reading bar codes on said original film which is provided with main numbers, sub numbers and said bar codes representing said main numbers and said sub numbers, said main numbers and said sub numbers being alternately provided on said original film at intervals, each of which is equivalent to the length of a half-size frame image;
   (b) a light source for printing said images;
   (c) an optical means for forming said images onto said printing paper; and (d) means for providing said printing paper with main frame numbers or sub frame numbers which correspond to said bar codes read by said reading means, whereby the images printed on said printing paper are made to correspond to said images on said original film using said frame numbers.

2. A photographic printing apparatus according to claim 1, further comprising: means for recording the information read by said reading means on a recording medium.

3. A photographic printing apparatus according to claim 2, wherein said recording means is adapted to record said information by punching a strip of paper tape.

4. A photographic printing apparatus according to claim 2, wherein the density of said images on said original film which are represented by said bar codes is detected by a density sensor, and the exposure corrected on the basis of the detected result is recorded on said recording medium in correspondence with said frame numbers.

5. A photographic printing apparatus according to claim 1, wherein said frame numbers are printed on the surface of said printing paper on which said images are not printed.

6. A photographic printing apparatus according to claim 1, further comprising: a control means for controlling said providing means such that it provides said printing paper with the main numbers or the sub numbers corresponding to the frame images read by said reading means when the read images are full-sized, or the main numbers and/or the sub numbers corresponding to the frame images read by said reading means when the images read by said reading means are half-sized.

7. A photographic printing apparatus according to claim 1, wherein said bar codes corresponding to said main numbers and said bar codes corresponding to said sub numbers are provided between both indications of said main numbers and the next main numbers, respectively.

8. A strip of original film developed after it has been exposed to form images thereon, including:
(a) main numbers and sub numbers alternately provided on the sides of frames at intervals, each of which is equivalent to the length of one half-sized frame;
(b) first bar codes located at the sides of said frames, said first bar codes representing said main numbers; and
(c) second bar codes located among said first bar codes, said second bar codes representing said sub numbers,
whereby selection of particular full-size frame images or particular half-size frame images can be made using said first bar codes and/or said second bar codes, in whatever pitch they are shifted in the longitudinal direction of said film when they are carried on said film.

9. A strip of original film according to claim 8, wherein said first bar codes are provided in the longitudinal direction of said film among said main numbers and said sub numbers.

10. A strip of original film according to claim 8, wherein said first and second bar codes are provided on one side of said film, and the other side thereof is provided with bar codes which identify at least one of the manufacturer and the type of film.

11. A photographic printing apparatus according to claim 8, wherein said bar codes corresponding to said main numbers and said bar codes corresponding to said sub numbers are provided between both indications of said main numbers and the next main numbers, respectively.

12. A photographic printing method of printing on a sheet of printing paper images carried on an original film which is provided with main numbers and sub numbers as well as bar codes corresponding to said main numbers and sub numbers, said main numbers and said sub numbers being alternately located on said original film at intervals, each of which is equivalent to the length of a half-sized image frame, including a step of:
providing said printing paper on which said images have been printed with said main numbers or said sub numbers when full-size frame images are printed, or either of said main numbers or said sub numbers or both of said main numbers and said sub numbers when half-size frame images are printed.

13. A photographic printing method according to claim 12, wherein the information represented by said bar codes is temporarily recorded on a recording medium, and said information is fetched from said recording medium when said images are printed on said printing paper so that it is provided on said printing paper.

14. A photographic printing method according to claim 13, wherein the corrected printing information on the frame images which correspond to said bar codes are also recorded on said recording medium.

15. A photographic printing apparatus for printing a plurality of images carried on an original film onto a sheet of printing paper, comprising:
(a) first reading means for reading bar codes on said original film provided with main numbers, sub numbers and said bar codes representing said main numbers and sub numbers, said main numbers and said sub numbers being alternately provided on said original film at intervals equivalent to the length of a half-size frame image;
(b) a sensor for detecting the density of the frame images which correspond to said bar codes read by said reading means;
(c) means for recording the frame images represented by said bar codes and the exposure corrected on the basis of the density of said frame images; and
(d) control means for correcting the exposure condition of said printing paper using the information recorded by said recording means, and for providing said printing paper with the image frames using said main numbers and/or said sub numbers.

16. A photographic printing apparatus according to claim 15, wherein said control means is adapted to collate the frame images printed on said printing paper with the frame images to be provided by a second reading means for reading said bar codes of said original film.

17. A photographic printing apparatus according to claim 15, wherein the frame images are provided on said printing paper by a printer provided in such a manner as to face the rear surface of said printing paper.

18. A photographic printing apparatus according to claim 15, wherein said first reading means for inputting said bar codes to said control means includes two components respectively provided in such a manner as to face the two sides of said original film.

19. A photographic printing apparatus according to claim 15, wherein said recording means includes a punched tape.

20. A photographic printing apparatus according to claim 15, wherein said corrected exposure is manually input to said control means.

21. A photographic printing apparatus according to claim 15, wherein said original film from which said frame numbers have been read by said first reading means is once removed, and is then set in a state wherein it is read by said second reading means.

22. A photographic printing apparatus according to claim 15, wherein said first and second reading means are adapted to read the bar codes which correspond to the frame images irradiated by a light source.

* * * * *